US008523967B2

(12) United States Patent
Arnaud et al.

(10) Patent No.: US 8,523,967 B2
(45) Date of Patent: Sep. 3, 2013

(54) LIQUID RESIN COMPOSITION FOR ABRASIVE ARTICLES

(75) Inventors: Alix Arnaud, Montrouge (FR); Philippe Espiard, Gouvieux (FR); Sandrine Pozzolo, Claye Souilly (FR)

(73) Assignees: Saint-Gobain Abrasives, Inc., Worcester, MA (US); Saint-Gobain Abrasifs Technologie et Services S.A.S., Conflans Sainte Honorine (FR)

( * ) Notice: Subject to any disclaimer, the term of this patent is extended or adjusted under 35 U.S.C. 154(b) by 353 days.

(21) Appl. No.: 12/681,288

(22) PCT Filed: Oct. 1, 2008

(86) PCT No.: PCT/FR2008/051778
§ 371 (c)(1),
(2), (4) Date: Aug. 6, 2010

(87) PCT Pub. No.: WO2009/053580
PCT Pub. Date: Apr. 30, 2009

(65) Prior Publication Data
US 2010/0298505 A1    Nov. 25, 2010

(30) Foreign Application Priority Data
Oct. 1, 2007 (FR) ..................................... 07 06881

(51) Int. Cl.
*B24D 3/28*      (2006.01)
*C09D 161/10*    (2006.01)
*C08L 61/10*     (2006.01)

(52) U.S. Cl.
USPC .................. 51/298; 51/295; 51/297; 51/307; 51/309; 525/480; 525/481; 525/534

(58) Field of Classification Search
None
See application file for complete search history.

(56) References Cited

U.S. PATENT DOCUMENTS

| 4,487,868 | A | * | 12/1984 | Armbruster et al. | 524/44 |
| 4,918,116 | A | * | 4/1990 | Gardziella et al. | 523/149 |
| 5,014,468 | A | * | 5/1991 | Ravipati et al. | 51/295 |
| 5,075,155 | A | * | 12/1991 | Jellinek et al. | 428/209 |
| 5,441,549 | A | * | 8/1995 | Helmin | 51/298 |
| 5,611,827 | A |   | 3/1997 | Hammarstrom et al. | |
| 5,650,478 | A | * | 7/1997 | Hansen et al. | 528/129 |
| 5,686,506 | A | * | 11/1997 | Gerber | 523/139 |
| 5,910,521 | A |   | 6/1999 | Johnson et al. | |
| 5,976,204 | A |   | 11/1999 | Hammarstrom et al. | |
| 2002/0184829 | A1 | | 12/2002 | Lemberger et al. | |
| 2003/0099150 | A1 | | 5/2003 | Lemberger et al. | |
| 2003/0192258 | A1 | | 10/2003 | Simon | |
| 2010/0270495 | A1 | | 10/2010 | Arnaud et al. | |

FOREIGN PATENT DOCUMENTS

| GB | 985 751 | 3/1965 |
| JP | 2001 214028 | 8/2001 |
| WO | 96 14187 | 5/1996 |
| WO | 98 12260 | 3/1998 |
| WO | 99 50352 | 10/1999 |
| WO | 02 092287 | 11/2002 |
| WO | 03 064111 | 8/2003 |

* cited by examiner

*Primary Examiner* — Michael J Feely
(74) *Attorney, Agent, or Firm* — Oblon, Spivak, McClelland, Maier & Neustadt, L.L.P.

(57) ABSTRACT

The invention relates to a liquid resin composition intended for manufacturing abrasives that comprises at least one novolac resin having a glass transition temperature less than or equal to 60° C., at least one reactive diluent and optionally at least one crosslinking agent. Application of the resin composition for producing abrasive articles, especially bonded abrasives and coated abrasives. It also relates to the abrasive articles comprising abrasive grains connected by such a liquid resin composition.

22 Claims, No Drawings

LIQUID RESIN COMPOSITION FOR ABRASIVE ARTICLES

The present application is a national stage application of PCT/FR2008/051778, filed Oct. 1, 2008 (published as WO 2009/053580 on Apr. 30, 2009), the text of which is incorporated by reference, and claims the priority of French application No. 0706881, filed on Oct. 1, 2007, the text of which is incorporated by reference.

The present invention relates to a liquid resin composition capable of being used in the manufacture of abrasive articles, and to the resulting abrasive articles.

Abrasive articles generally incorporate a multitude of abrasive grains firmly bound to a support or together by a binder. These articles are widely used for machining various materials, especially in cutting, grinding, deburring and polishing operations.

Conventionally, a distinction is made between coated abrasives and bonded abrasives.

Coated abrasives comprise a generally flexible support material, spread on the surface of which are abrasive grains set in a binder. The flexible support may be a sheet of paper, a film or a network of fibres, for example a mat, a felt, a woven or a knit of natural or synthetic fibres, especially made from glass or a polymer. These abrasives may adopt various forms: sheets, strips, discs, etc.

The manufacture of coated abrasives comprises the application of a make coat on the support material, the distribution of the abrasive grains on said coat, heat treatment of the make coat with a view to partially curing it and the application of a size coat which guarantees a firm anchoring of the grains on the support. A supersize coat may be deposited on the size coat and the abrasive grains.

The make, size and supersize coats are applied in liquid form. They are generally composed of a thermosetting resin, especially a resol type phenolic resin.

Bonded abrasives are composed of abrasive grains bound together by a binder which makes it possible to have a three-dimensional structure suitable for carrying out abrasion operations, especially cutting hard material such as steel. Generally, these abrasives have the appearance of a grinding wheel, a grinding wheel segment and a whetstone.

Bonded abrasives in the form of "conventional" grinding wheels are formed from a single region composed of abrasive grains embedded in the binder which extends from the bore to the periphery of the wheel. In "superabrasive" wheels the abrasion region is located at the periphery, in the form of a strip supported by a central core generally made of metal, and the abrasive grains are composed of a very hard material, for example diamond or cubic boron nitride.

Bonded abrasives are obtained by the process using cold or hot compression moulding techniques.

In cold compression moulding, which is the most widespread, the mixture of the abrasive constituents, in granular form, is introduced into a mould, then a sufficient compressive force is applied, of around 15 to 25 N/mm$^2$, to make said mixture into the shape of the mould and to ensure that, after extraction from the mould, the part obtained (green article) has sufficient strength in order to be able to be handled without losing its initial shape. The part is then heated in an oven at a temperature that allows the binder to be crosslinked, this temperature depending on the nature of the binder used.

Hot compression moulding makes it possible to achieve a higher level of compaction than cold moulding, which is expressed by a lower pore volume in the final article. In this process, the granular mixture introduced into the mould is compacted under pressure and simultaneously heated in order to enable the binder to spread out better between the abrasive grains and to occupy the empty spaces. After having been removed from the mould, the part generally undergoes a post-crosslinking heat treatment that aims to improve its operating lifetime and its abrasion performance.

Whatever type of compression moulding used, either cold or hot, it is essential that the mixture of the abrasive constituents is in granular form.

The preparation of the granular mixture is carried out by pretreating the abrasive grains with a liquid impregnation resin, in general a resol type phenolic resin, then by mixing the wet grains with a novolac type phenolic resin powder containing a crosslinking agent—powder which will subsequently form the binder itself—and if necessary additives, also in powder form. The mixture obtained is thus composed of abrasive grains, bonded to the surface of which are solid resin and additive particles. This mixture has a good ability to be uniformly distributed in the mould (referred to as "flowability") and to be shaped under the effect of pressure.

The resol type thermosetting resins used for manufacturing coated and bonded abrasives have many advantages under the intended usage conditions, especially:

they provide a solid bond between the grains and the support material and between the grains themselves;

they withstand well the high mechanical stresses that occur under the peripheral high-speed grinding conditions, which makes it possible to prevent the tool from breaking; and their high thermal resistance makes it possible to limit the risk of excessive heat build-up within the tool.

One drawback of the aforementioned resols lies in the fact that they contain formaldehyde which is harmful to human health and to the environment.

It is known that resols contain free formaldehyde which may be emitted into the atmosphere during the manufacture of the abrasives, and that they can, in addition, generate formaldehyde under the usage conditions of the abrasive, when the temperature reaches a level that leads to the degradation of the resol with release of formaldehyde.

For several years now, the regulations regarding formaldehyde emissions have been getting stricter and tend to limit the amount of formaldehyde which is contained in abrasives or which may be emitted from these products.

Many resin compositions having a low formaldehyde content have been proposed.

Proposed in U.S. Pat. No. 6,133,403 are reactive diluents for phenolic compositions and crosslinkable novolacs intended for producing composite materials that have a high impact strength.

WO 2005/108454 A1 describes a novolac resin and non-formaldehyde hardener composition for reinforcing composites.

Described in U.S. Pat. No. 5,523,152 is a curable composition for abrasives that comprises an aminoplast resin and a reactive diluent which both contain unsaturated pendant groups.

U.S. Pat. No. 5,178,646 describes a binder precursor composition for abrasives, especially coated abrasives, which comprises a thermally curable resin having a plurality of pendant methylol groups and a reactive diluent having at least one functional group that reacts with the groups of the resin.

The present invention aims to reduce the amount of formaldehyde in an abrasive product.

For this purpose, the invention provides a liquid resin composition which replaces the resol used as an adhesive in coated abrasives and as an impregnation resin in bonded abrasives, this liquid resin composition being characterized in that it comprises at least one novolac resin having a glass transition temperature less than or equal to 60° C., at least one reactive diluent and optionally at least one crosslinking agent The novolac resin according to the invention is chosen from the novolacs having a glass transition temperature less than or equal to 60° C., preferably less than or equal to 50° C. and advantageously between 35 and 45° C.

The novolac may be chosen from the novolacs known to a person skilled in the art which are obtained by reaction of a phenolic compound with an aldehyde in an aldehyde/phenolic compound molar ratio of less than 1, in the presence of an acid catalyst.

The phenolic compound is chosen from phenol and substituted phenols such as cresols, guaiacol, methoxyphenols, catechol, resorcinol, tert-butylphenol and nonylphenol, bisphenols such as bisphenol A, naphthols and mixtures of these compounds. Preferably, phenol is chosen.

The aldehyde is chosen from alicyclic aldehydes such as formaldehyde, cyclic aldehydes such as furfural, aromatic aldehydes such as benzaldehyde, para-anisaldehyde, ortho-anisaldehyde and veratraldehyde, and mixtures of these aldehydes. Preferably, formaldehyde is chosen.

Preferably, the formaldehyde/phenol molar ratio varies from 0.2 to less than 1, advantageously from 0.35 to 0.9 and better still from 0.5 to 0.9.

The novolac resin may be prepared by using a known acid catalyst, for example a strong mineral acid such as sulphuric acid, phosphoric acid and hydrochloric acid, or an organic acid such as oxalic acid, salicylic acid or anhydrides such as maleic anhydride. The amount of acid must be sufficient to allow the condensation of the phenolic compound and of the aldehyde. The amount of acid used generally represents from 0.02 to 1% of the weight of the starting phenolic compound, preferably 0.1 to 0.6% in the case of a strong mineral acid, and from 0.3 to 3% of the weight of the starting phenolic compound in the case of an organic acid.

Preferably, the novolac resin obtained at the end of the condensation reaction is treated so as to reduce the content of free phenolic compound, for example by vacuum distillation.

The novolacs that can be used within the scope of the invention contain less than 0.1% by weight of free formaldehyde, and preferably less than 0.05%.

The resin composition may comprise at least one resin capable of reacting with the crosslinking agent, which is different from the novolac, for example an epoxy resin, in particular a novolac resin bearing one or several epoxy pending groups. Such an epoxidized novolac resin may be conventionally obtained by treating a novolac resin with an excess of epichlorohydrin in the presence of a basic catalyst, for example sodium hydroxide, at a temperature of around 100° C. The proportion of novolac resin according to the invention must however remain greater than or equal to 50% by weight of all the resins, novolac(s) and other resin(s), preferably greater than or equal to 75% and advantageously the proportion is equal to 100%.

The novolac resin according to the invention represents at least 30% by weight of the resin composition, preferably at least 40% and advantageously at least 50%, and does not exceed 85%.

The reactive diluent according to the invention is a compound which is liquid at room temperature, around 20 to 25° C., which makes it possible to dissolve the novolac resin and to adjust the viscosity of the resin composition.

Preferably, the reactive diluent has a viscosity less than or equal to 1000 mPa·s, preferably less than or equal to 700 mPa·s, advantageously less than 500 mPa·s and better still less than 350 mPa·s.

The reactive diluent also contains at least one functional group capable of reacting with the resin and optionally with the crosslinking agent, a functional group that is chosen from the hydroxy, aldehyde, epoxy, oxazolidine and lactone functional groups.

As examples of reactive diluents comprising hydroxy functional groups, mention may be made of saturated or unsaturated alicyclic alcohols, such as ethylene glycol, 1,3-butylene glycol, glycerol, trimethylolpropane and the monoallyl ethers of these compounds, saturated or unsaturated cyclic alcohols, such as furfuryl alcohol, mononuclear or polynuclear aromatic alcohols, such as benzyl alcohol and its derivatives, m-cresol, 3,5-xylenol, nonylphenol, cardanols and their derivatives such as cardols, methyl cardols and anacardic acids especially contained in cashew nut shells ("cashew nut shell liquid") denoted as CNSL), and naphthol, and the precursors of these alcohols, especially acetals and trioxanes.

As examples of reactive diluents comprising aldehyde functional groups, mention may be made of glyoxal.

As examples of reactive diluents comprising epoxy functional groups, mention may be made of glycidyl ethers of saturated or unsaturated alcohols such as 1,6-hexanediol diglycidyl ether, epoxidized fatty acids especially contained in epoxidized oils, in particular soybean oil (ECOCET®, from Arkema) and linseed oil (VIKOFLEX®, from Arkema), aromatic epoxies such as epoxidized cardanols, especially 3-n-pentadecadienylphenol.

As examples of reactive diluents comprising oxazolidine functional groups, mention may be made of 3-ethyl-2-methyl (3-methylbutyl)-1,3-oxazolidine, 1-aza-3,7-dioxa(5-ethyl) bicyclo[3.3.0]octane and bisoxazolidines, especially sold under the reference INCOZOL®LV by Incorez.

The preferred reactive diluent comprising a lactone functional group is gamma-butyrolactone. Advantageously, gamma-butyrolactone is used in admixture with triphenylphosphite, which permits to improve the thermal behaviour of the liquid resin composition.

The preferred diluents are glycerol, furfuryl alcohol, benzyl alcohol, cardanols and derivatives thereof (CNSL), 1,6-hexanediol diglycidyl ether, epoxidized cardanols, 3-ethyl-2-methyl(3-methylbutyl)-1,3-oxazolidine, 1-aza-3,7-dioxa(5-ethyl)bicyclo[3.3.0]-octane, bisoxazolidines and gamma-butyrolactone.

The reactive diluent represents at least 10% by weight of the resin composition, preferably at least 20%, and advantageously does not exceed 69%, preferably 30%. Below 10%, the viscosity of the resin composition is too high for it to be used in the targeted applications. Above 69%, the mechanical properties of the final abrasive product are not satisfactory.

The crosslinking agent must have a high reactivity with regards to the novolac resin and the reactive diluent.

The crosslinking agent is chosen from compounds incorporating at least one hydroxy or aldehyde functional group, heterocyclic compounds that have a structure incorporating a nitrogen atom and an oxygen atom separated by a carbon atom, nitroacetals and nitrones.

As examples of compounds that incorporate at least one hydroxy functional group, mention may be made of nitro alcohols such as tris(hydroxymethyl)nitromethane.

As examples of compounds incorporating at least one aldehyde functional group, mention may be made of glyoxal and 2,2-dimethoxyethanal.

As examples of heterocyclic compounds incorporating a nitrogen atom and an oxygen atom separated by a carbon atom, mention may be made of oxazolines such as 1,3-phenylenebisoxazoline and oxazolidines such as 3-ethyl-2-methyl-2-(3-methylbutyl)-1,3-oxazolidine and 1-aza-3,7-dioxa(5-ethyl)bicyclo[3.3.0]octane.

The preferred crosslinking agent is tris(hydroxymethyl)nitromethane, glyoxal, 3-ethyl-2-methyl-2-(3-methylbutyl)-1,3-oxazolidine and 1-aza-3,7-dioxa(5-ethyl)bicyclo[3.3.0]octane. 1-aza-3,7-dioxa(5-ethyl)bicyclo[3.3.0]octane is particularly advantageous as it can act both as a reactive diluent and as a crosslinking agent.

The crosslinking agent preferably represents at least 1% by weight of the liquid resin composition, advantageously at least 20%, better still at least 30% and generally does not exceed 40%.

The liquid resin composition may also comprise at least one crosslinking catalyst. The catalyst is chosen from compounds comprising at least one secondary or tertiary amine functional group such as hydroxylamine, triethylamine, diazabicycloundecene, benzyldimethylamine and 2,4,6-tri(dimethylaminomethyl)phenol, imidazoles and imadazole derivatives, for example 2-methylimidazole, 2-ethyl-4-methylimidazole and 1-benzyl-2-methylimidazole, trialkyl and triaryl nucleophiles of group V(A) elements, for example triethanolamine, trimethylphosphine and triphenylphosphine, borates, for example tetraphenylphosphonium tetraphenylborate and tetraphenylphosphonium tetrafluoroborate, and ammonium salts such as tetramethylammonium hydroxide and benzyltrimethylammonium hydroxide. The preferred catalysts are triethylamine, 2,4,6-tridimethylaminomethyl)phenol, 2-methylimidazole, 2-ethyl-4-methylimidazole and trimethylphosphine.

Catalysts that are in liquid form are preferred, mainly for ease-of-use reasons.

The amount of catalyst in the liquid resin composition is less than or equal to 10 parts by weight per 100 parts by weight of novolac resin, reactive diluent and optionally crosslinking agent, and preferably is less than or equal to 5 parts.

Preparation of the liquid resin composition may be carried out by simple mixing of the constituents in a suitable vessel, advantageously equipped with stirring means; preferably, the novolac resin is introduced into the reactive diluent, then, if necessary, the crosslinking agent and the catalyst are added.

The constituents may be mixed at room temperature, around 20 to 25° C., or at a higher temperature, preferably at least 10° C. above the glass transition temperature of the novolac resin and advantageously less than or equal to 50° C. so as to prevent the thermal degradation and/or crosslinking of the constituents of the resin composition.

The viscosity of the liquid resin composition depends on the targeted application but remains less than or equal to 7000 mPa·s.

According to a first embodiment, the liquid resin composition according to the invention is used to manufacture bonded abrasives.

The liquid resin composition is first mixed with abrasive grains in a conventional mechanical mixer until the grains are suitably "wetted", that is to say are coated with the resin composition, then the powdered binder and the additives, also powdered, are added until a homogeneous granular mixture is obtained.

Preferably, the liquid resin composition has a viscosity at most equal to 3000 mPa·s, and advantageously greater than or equal to 600 mPa·s.

The crosslinking start temperature of the resin in the granular mixture is at most equal to 245° C., and advantageously at most equal to 195° C.

The time required to obtain complete crosslinking of the resin composition in the granular mixture is less than or equal to 36 hours, preferably less than or equal to 20 hours.

The abrasive grains may be any type of known abrasive grains, for example made of alumina, including therein fused aluminas and sintered aluminas obtained by the sol-gel process, which may or may not be seeded by a material of the same crystalline nature, and which may or may not be chemically modified, of iron oxide, molybdenum oxide, vanadium oxide, alumina-zirconia, boron-alumina, silicon carbide, aluminium oxynitride, diamond or cubic boron nitride, and mixtures of such grains. Preferably, the abrasive grains are made of alumina.

Preferably, the abrasive grains are pretreated with an organic compound that improves the adhesion between the grain and the liquid resin composition, chosen from compounds that contain silicon, for example a silane functionalized by organic groups such as a vinylsilane, especially vinyltriethoxysilane, an aminosilane, especially γ-aminopropyltrimethoxysilane, γ-aminopropyltriethoxysilane and diaminopropyl-ethoxysilane, or an epoxysilane. Preferably, γ-aminopropyltriethoxysilane is used.

The abrasive grains may be treated with the organic compound that contains silicon by, for example, spraying a solution of said compound in a suitable solvent, usually water, or by dispersing the grains in the aforementioned solution. The treated abrasive grains are dried before being mixed with the liquid resin composition.

If necessary, it is possible to add to the abrasive grain and resin composition mixture, an organic liquid medium which helps to wet the grains and to form a uniform grain network, and which is subsequently removed during the crosslinking step. The organic medium may be water, an aliphatic alcohol, a glycol, high molecular weight petroleum fractions of oily or waxy consistency, a mineral oil or any other known medium.

The binder may be a phenol-aldehyde, melamine-aldehyde, urea-aldehyde, polyester, polyimide, epoxy, polyurethane or polybenzimidazole resin. Preferably, the binder is a resin having a low level of formaldehyde, advantageously a phenol-aldehyde resin of novolac type, and better still a phenol-formaldehyde novolac resin.

The additives are, for example, fillers, crosslinking agents and other compounds used for manufacturing bonded abrasives, especially those bonded by an organic resin.

The fillers are generally in the form of a finely divided powder comprising particles which may have the appearance, in particular, of granules, spheres or fibres. As examples, mention may be made of sand, silicon carbide, hollow alumina spheres, bauxite, chromites, magnesite, dolomites, hollow mullite spheres, borides, fumed silica, titanium dioxide, carbon-based products (carbon black, coke, graphite, etc.), wood flour, clay, talc, hexagonal boron nitride, molybdenum disulphide, feldspar, nepheline syenite and glass, in particular in the form of solid, cellular or hollow beads, and fibres. Generally, fillers represent 0.1 to 30% by weight of the granular mixture.

Crosslinking agents are used when the powdered binder is a novolac resin. They may be chosen from the compounds known for providing the aforementioned function such as hexamethylenetetramine or precursors thereof. The crosslinking agent is added in an amount of 5 to 20 parts by weight per 100 parts by weight of powdered novolac resin.

The additives may also comprise agents which help in carrying out the process, for example antistatic agents and lubricants. The amount of these additives may be easily determined by a person skilled in the art.

Preferably, the granular mixture is subjected to a curing treatment at ambient temperature for a duration of around 12 hours.

The granular mixture is then introduced into a mould equipped with compression means that makes it possible to form a green article that has sufficient cohesion to be able to be handled and treated in the following steps without a substantial change in its shape. At this stage the binder is in the non-crosslinked state.

The green article is then heated at a sufficient temperature so that the binder may crosslink and give a rigid polymer network that imparts to the article its final shape. Crosslinking is carried out according to a conventional curing cycle that consists in bringing the green article to a temperature of around 100° C. and in keeping it at this temperature for 30 minutes to several hours so that the volatile products formed can be discharged. Next, the article is heated at the final temperature for a duration that generally varies from 10 to 36 hours.

The final crosslinking temperature especially depends on the nature of the resin used, on the size and shape of the part to be treated and also on the curing duration. In general, the final crosslinking temperature is between 100 and 200° C.

Thermal crosslinking is carried out in a controlled atmosphere, preferably with a maximum degree of relative humidity.

The bonded abrasives obtained may be in the form of grinding wheels, grinding wheel segments, discs and whetstones.

According to a second embodiment, the liquid resin composition according to the invention is used to manufacture coated abrasives.

As already indicated, the manufacture of coated abrasives comprises the steps that consist in depositing a make coat on a support material, in spreading the abrasive grains on said coat, subjecting said material to a heat treatment that makes it possible to partially crosslink the resin composition, depositing a size coat and subjecting the coated material to a heat treatment so as to obtain the complete crosslinking of the resin composition. If necessary, a supersize coat may be deposited on the size coat and crosslinked by a suitable heat treatment.

The support material generally has a moderate to high flexibility, and has the appearance of a sheet, especially of paper, a film, especially a polymer film, or a more or less dense network of natural or synthetic fibres, for example glass fibres and vulcanized fibres.

The abrasive grains may be chosen from the grains already mentioned that are incorporated into the composition of bonded abrasives.

The application of the grains onto the make coat may be carried out by the usual techniques that operate by gravity or by an electrostatic route. The density of the abrasive grains on the support is chosen as a function of the desired application.

The liquid resin composition according to the invention may be used to form the make coat, the size coat or the supersize coat. Preferably, the liquid resin composition is used to form the make coat and the size coat, and where necessary the supersize coat.

Preferably, the liquid resin composition has a viscosity less than or equal to 6000 mPa·s and a crosslinking start temperature at most equal to 150° C., advantageously at most equal to 120° C.

Preferably also, the liquid resin composition contains at least one abovementioned crosslinking agent.

The time required to obtain complete crosslinking of the resin composition is less than 36 hours, preferably less than 20 hours.

The make, size and supersize coats which are not formed from the liquid resin composition according to the invention may be chosen from phenolic, urea-formaldehyde, epoxy, urethane, acrylic, aminoplast and melamine resins, and mixtures of these resins. Preferably, the resin or resin mixture has the lowest possible level of free formaldehyde.

The liquid resin composition may comprise, in addition, additives, for example wetting agents, fillers, coupling agents, dyes, pigments and antistatic agents.

When the liquid resin composition is used to form the size coat and/or the supersize coat, it advantageously comprises at least one agent that strengthens the abrasive performance of the final abrasive. Such an agent may be chosen from waxes, organic halogenated compounds, halogen salts, metals and metal alloys.

The heat treatment of the support material coated with the liquid resin composition forming the make coat is carried out at a temperature less than or equal to 150° C., preferably less than or equal to 120° C. for 1 to 120 minutes, preferably 1 to 60 minutes.

The heat treatment conditions for crosslinking the resin composition forming the size coat or supersize coat may be carried out at a temperature less than or equal to 150° C., preferably less than or equal to 120° C. for at most 36 hours, preferably at most 20 hours.

The examples given below make it possible to illustrate the invention without however limiting it.

In the examples, the properties of the liquid resin compositions and of the test pieces are measured under the following conditions:

Resin Compositions
- the crosslinking start temperature is measured by dynamic mechanical analysis (DMA): the liquid resin composition is introduced between two glass plates and the assembly is positioned horizontally in a device comprising two lower jaws fixed at a distance of 40 mm apart and an upper jaw applied against the upper sheet located at 20 mm from each of the preceding jaws. A force of 80 mPa is applied to the upper jaw with an oscillation frequency of 1 Hz, while heating the assembly from 25 to 300° C. at the rate of 4° C./minute. The elastic modulus of the resin composition is measured as a function of the temperature and the crosslinking start temperature is determined from the established curve.
- the weight loss at 500° C. is determined by thermogravimetric analysis (TGA): the liquid resin composition is deposited in an aluminium pan and heated according to a given temperature cycle. 10 to 20 mg of the crosslinked resin composition are placed in an alumina crucible which is put into a machine continuously measuring the weight loss during a temperature cycle ranging from 25 to 700° C. at the rate of 10° C./minute. The weight loss at 500° C. is determined from the recorded curve.

Test Pieces
- The flexural strength and Young's modulus are measured under the conditions of the ASTM D790-91 standard using a three-point-bending test with a 50.8 mm gap and a crosshead speed of 2.54 mm/minute. For each test piece, the average flexural strength and the average Young's modulus established over 6 measurement points and the standard deviation (s.d.) are given.

EXAMPLES 1 TO 12

Liquid resin compositions for manufacturing bonded abrasives.

a) Preparation of the Resin Compositions

Liquid resin compositions having the composition given in Table 1 (in parts by weight) were prepared.

The resins were obtained by dissolving the novolac resin in the reactive diluent, at ambient temperature (20-25° C.) and with moderate stirring, then by adding the crosslinking agent and the catalyst while maintaining the stirring conditions.

These liquid resin compositions, and also the reference composition containing a resol (Reference 1) were treated according to the following temperature cycle:

hold at 70° C. for 35 minutes;
70 to 80° C. in 5 minutes;
hold at 80° C. for 50 minutes;
80 to 90° C. in 5 minutes;
hold at 90° C. for 50 minutes;
90 to 100° C. in 5 minutes;
hold at 100° C. for 42 minutes;
100 to 115° C. in 5 minutes; and
hold at 115° C. for 42 minutes.

The compositions were then subjected to a post-curing treatment at 200° C. for 2 hours, then they were cooled to room temperature.

The crosslinking start temperature and the weight loss at 500° C. for these resin compositions are given in Table 1.

b) Preparation of the Test Pieces

The granular mixtures having the composition given in Table 2 below were prepared:

TABLE 2

|  | Ex. 7a | Ex. 7b | Ex. 7c | Ref. 1 |
|---|---|---|---|---|
| Abrasive grains, alumina of grain 60 (406 μm)[9] | 452.74 g | 452.74 g | 452.74 g | 452.74 g |
| Liquid resin Resin composition (Ex. 7) | 7.29 g | 9.86 g | 12.44 g | — |
| Resol[2] | — | — | — | 7.29 g |
| Solid resin[8] | 35.59 g | 33.02 g | 30.45 g | 35.59 g |

The test pieces were obtained by moulding 75.64 g of the granular mixture obtained in b) in a mould having dimensions of 10.224 cm×2.591 cm×1.27 cm. The green test pieces were removed from the mould, hermetically sealed in aluminum foil and cured in an oven according to the following temperature cycle:

25 to 60° C. in 10 minutes;
60 to 100° C. in 40 minutes;
hold at 100° C. for 80 minutes;
100 to 160° C. in 180 minutes; and
hold at 160° C. for 10 hours.

The test pieces were separated into two series: the first series did not undergo any treatment, the second was submerged in boiling water for 2 hours to simulate accelerated ageing conditions.

Measurements of the flexural strength and Young's modulus are given in Table 3 below:

TABLE 3

|  | Without treatment | | | | After treatment | | | |
|---|---|---|---|---|---|---|---|---|
| Ex. | Flexural strength (MPa) | s.d. | Young's modulus (MPa) | s.d. | Flexural strength (MPa) | s.d. | Young's modulus (MPa) | s.d. |
| 7a | 31.60 | 2.02 | 4030 | 68 | 11.70 | 0.60 | 1868 | 74 |
| 7b | 35.42 | 2.35 | 4158 | 201 | 13.00 | 0.30 | 2049 | 88 |
| 7c | 34.20 | 0.40 | 4218 | 134 | 13.50 | 0.30 | 2052 | 89 |
| Ref. 1 | 37.66 | 1.28 | 4210 | 135 | 11.81 | 0.30 | 1882 | 142 |

EXAMPLES 13 TO 26

Liquid resin compositions for manufacturing coated abrasives.

Resin compositions having the composition given in Table 4 (in parts by weight) were prepared under the conditions for Examples 1 to 12.

The resin compositions of Examples 13 to 26, and also the reference resol (Reference 2) were treated according to the temperature cycle described in paragraph a) of the aforementioned Examples 1 to 12, then were cooled.

The crosslinking start temperature and the weight loss at 500° C. for these resin compositions are given in Table 4.

EXAMPLES 13 TO 26

Liquid resin compositions for manufacturing coated abrasives.

Resin compositions having the composition given in Table 5 (in parts by weight) were prepared under the conditions of examples 1 to 12.

Resin compositions according to examples 27 to 38 were treated according to temperature cycle and post-curing treatment disclosed at paragraph a) of examples 1 to 12.

The crosslinking start temperature and the weight loss at 500° C. for these resin compositions are given in Table 5.

EXAMPLES 39 TO 41

Liquid resin compositions for manufacturing bonded abrasives.

a) Preparation of the Resin Compositions

Liquid resin compositions having the composition given in the following Table 6 (in parts by weight) were prepared:

TABLE 6

| Ex. | Resin | Reactive diluent | Resin/Reactive diluents (parts by weight) |
|---|---|---|---|
| 39 | novolac[1] | butan-1-ol | 70/30 |
| 40 | novolac[1] | γ-butyrolactone | 70/30 |
| 41 | novolac[1] | furfuryl alcohol | 70/30 |

The resins were obtained by dissolving the novolac resin in the reactive diluent, at a temperature of the order of 35 to 40° C.

These liquid resin compositions were treated according to temperature cycle and post-curing treatment disclosed at paragraph a) of the abovementioned examples 1 to 12.

The weight loss at 500° C. for these resin compostions is as follows:

| Example | Weight loss at 500° C. (%) |
|---|---|
| 39 | 48 |
| 40 | 43 |
| 41 | 48 | b) Preparation of the Resin Compositions

Granular mixtures having the following composition were prepared:

| | Example | Reference 3 |
|---|---|---|
| Abrasive grains | 452.74 g | 452.74 g |
| Liquid resin | | |
| Resin composition (Ex. 7, 39-41) | 9.86 g | — |
| Resole[2] | — | 7.29 g |
| Solid resin[8] | 33.02 g | 35.59 g |

Abrasive grains were alumina grains of grain 60 (406 μm) [9] which were treated by immersion in an aqueous solution of gamma-aminopropyltriethoxysilane (2% by weight), then were dried in an oven at 120° C. for 2 hours.

The test pieces were obtained by moulding the granular mixture and curing them in the conditions disclosed at paragraph b) of examples 1 to 12.

The test pieces were separated into two series: the first series did not undergo any treatment, the second was submerged in boiling water for 2 hours to simulate accelerated ageing conditions.

Measurements of the flexural strength and Young's modulus are given in Table 7 below:

TABLE 7

| | Without treatment | | | | After treatment | | | |
|---|---|---|---|---|---|---|---|---|
| Ex. | Flexural strength (MPa) | s.d. | Young's modulus (MPa) | s.d. | Flexural strength (MPa) | s.d. | Young's modulus (MPa) | s.d. |
| 7 | 42.50 | 1.90 | 4813 | 71 | 30.60 | 2.20 | 3654 | 167 |
| 39 | 46.00 | 0.40 | 4886 | 132 | 25.00 | 1.50 | 3010 | 208 |
| 40 | 49.80 | 1.20 | 5007 | 101 | 34.10 | 1.60 | 3854 | 150 |
| 41 | 51.00 | 4.60 | 4800 | 581 | 37.50 | 3.40 | 4320 | 47 |
| Ref. 3 | 47.30 | 1.70 | 4886 | 108 | 21.70 | 0.80 | 3133 | 82 |

(1) Sold under the reference BAKELITE® PF8505F by Hexion Specialty Chemicals; glass transition temperature: 42° C.
(2) Sold under the reference BAKELITE® 043SW07 by Hexion Specialty Chemicals.
(3) Sold under the reference NC513 by Cardolite Europe.
(4) Sold under the reference Cashew Nut Shell Liquid (CNSL) by Palmer Ltd.; cardanol content (>60 wt %).
(5) Sold under the reference HELOXY® MODIFIER HD by Hexion.
(6) Sold under the reference INCOZOL® LV by Incorez.
(7) Sold under the reference HIGHLINK-CDO by Clariant; 60% solution in water.
(8) Sold under the reference BAKELITE® 8686 by Hexion Specialty Chemicals; contains 7 wt % of hexamethylenetetramine (HEXA).
(9) Sold under the reference ALUMINE 57A by Saint-Gobain Ceramics and Plastics.
(10) Sold under the reference BAKELITE® PF0361SW01 by Hexion Specialty Chemicals.
(11) Sold under the reference EPIKOTE® 600 by Hexion Specialty Chemicals.

TABLE 1

| Ex. | Resin | Reactive diluent | Crosslinking agent | Catalyst | Resin/reactive diluent/crosslinking agent/catalyst (parts by weight) | Crosslinking start temperature (° C.) | Weight loss at 500° C. (%) |
|---|---|---|---|---|---|---|---|
| 1 | Novolac[1] | Cardolite[3] | TNE | TEA | 50/20/30/5 | 154 | 34.80 |
| 2 | Novolac[1] | CNSL[4] | TNE | TEA | 50/20/30/5 | 148 | 37.70 |

TABLE 1-continued

| Ex. | Resin | Reactive diluent | Crosslinking agent | Catalyst | Resin/reactive diluent/crosslinking agent/catalyst (parts by weight) | Crosslinking start temperature (° C.) | Weight loss at 500° C. (%) |
|---|---|---|---|---|---|---|---|
| 3 | Novolac[1] | 1,6-hexanediol diglycidyl ether[5] | TNE | TEA | 50/20/30/5 | 158 | 39.80 |
| 4 | Novolac[1] | bisoxazolidine[6] | TNE | TEA | 50/20/30/5 | 155 | 24.30 |
| 5 | Novolac[1] | glycerol | TNE | TEA | 50/20/30/5 | 191 | 22.90 |
| 6 | Novolac[1] | Glyoxal | TNE | TEA | 50/20/30/5 | 175 | 26.10 |
| 7 | Novolac[1] | furfuryl alcohol | TNE | — | 50/20/30 | 188 | 19.50 |
| 8 | Novolac[1] | furfuryl alcohol | glyoxal | — | 50/20/30 | 122 | 26.60 |
| 9 | Novolac[1] | furfuryl alcohol | 1,3-phenylene bis oxazoline | — | 50/20/30 | 245 | 47.60 |
| 10 | Novolac[1] | furfuryl alcohol | 3-ethyl-2-methyl-2-(3-methylbutyl)-1,3-oxazolidine | — | 50/20/30 | 245 | 48.00 |
| 11 | Novolac[1] | furfuryl alcohol | 2,2-dimethoxy-ethanal | — | 50/20/30 | 230 | 38.00 |
| 12 | Novolac[1] | furfuryl alcohol | glyoxal derivative[7] | — | 50/20/30 | 170 | 30.70 |
| Ref. 1 | Resol[2] | — | — | — | 100/0/0/0 | 133 | 17 |

TNE: tris(hydroxymethyl)nitromethane; TEA: triethanolamine.

TABLE 4

| Ex. | Resin | Reactive diluent | Crosslinking agent | Catalyst | Resin/reactive diluent/crosslinking agent/catalyst (parts by weight) | Crosslinking start temperature (° C.) | Weight loss at 500° C. (%) |
|---|---|---|---|---|---|---|---|
| 13 | Novolac[1] | Cardolite[3] | TNE | TEA | 50/20/30/5 | 154 | 40.25 |
| 14 | Novolac[1] | CNSL[4] | TNE | TEA | 50/20/30/5 | 148 | 47.20 |
| 15 | Novolac[1] | 1,6-hexanediol diglycidyl ether[5] | TNE | TEA | 50/20/30/5 | 158 | 45.30 |
| 16 | Novolac[1] | bis oxazolidine[6] | TNE | TEA | 50/20/30/5 | 155 | 38.40 |
| 17 | Novolac[1] | benzyl alcohol | TNE | TEA | 50/20/30/5 | 150 | 43.70 |
| 18 | Novolac[1] | Glyoxal | TNE | TEA | 50/20/30/5 | 175 | 40.90 |
| 19 | Novolac[1] | 1-aza-3,7-dioxa(5-ethyl)bicyclo[3.3.0]octane | TNE | TEA | 50/20/30/5 | 150 | 28.20 |
| 20 | Novolac[1] | furfuryl alcohol | TNE | TEA | 50/20/30/5 | 161 | 27.80 |
| 21 | Novolac[1] | furfuryl alcohol | glyoxal | TEA | 50/20/30/5 | 225 | 42.20 |
| 22 | Novolac[1] | furfuryl alcohol | 1,aza-3,7-dioxa(5-ethyl)bicyclo[3.3.0]octane | — | 50/20/30 | 175 | 35.00 |
| 23 | Novolac[1] | furfuryl alcohol | 1,3-phenylene bis oxazoline | TPP | 50/20/30/10 | 245 | 38.30 |
| 24 | Novolac[1] | 1-aza-3,7-dioxa(5-ethyl)bicyclo[3.3.0]octane | 1-aza-3,7-dioxa(5-ethyl)bicyclo[3.3.0]octane | — | 70/30 | 170 | 39.00 |
| 25 | Novolac[1] | benzyl alcohol | 1-aza-3,7-dioxa(5-ethyl)bicyclo[3.3.0]octane | TEA | 50/20/230/5 | 153 | 39.00 |
| 26 | Novolac[1] | Glycerol | 1-aza-3,7-dioxa(5-ethyl)bicyclo[3.3.0]octane | TEA | 50/20/30/5 | 175 | 34.90 |
| Ref. 2 | resol[10] | — | — | — | 100/0/0/0 | 125 | 24.10 |

TNE: tris(hydroxymethyl)nitromethane; TEA: triethanolamine; TPP: triphenylphosphine.

TABLE 5

| Ex. | Resin novolac[1]/ epoxydized novolac[11] (parts by weight) | Reactive diluent (parts by weight) | Catalyst | Resin/reactive diluent/catalyst (parts by weight) | Crosslinking start temperature (°C.) | Weight loss at 500° C. (%) |
|---|---|---|---|---|---|---|
| 27 | 35/35 | furfuryl alcohol | 2-methyl-imidazole | 70/30/2 | 116 | n.d. |
| 28 | 57/23 | γ-butyrolactone | 2,4,6-tri(dimethyl-aminomethyl)phenol | 80/20/2 | n.d. | 42 |
| 29 | 35/35 | γ-butyrolactone | 2,4,6-tri(dimethyl-aminomethyl)phenol | 70/30/2 | 110 | 52 |
| 30 | 50/20 | γ-butyrolactone | 2,4,6-tri(dimethyl-aminomethyl)phenol | 70/30/2 | 110 | 44 |
| 31 | 35/35 | furfuryl alcohol/γ-butyrolactone 70/30 | 2,4,6-tri(dimethyl-aminomethyl)phenol | 70/30/2 | 115 | 52 |
| 32 | 35/35 | γ-butyrolactone/ triphenylphosphite 30/70 | 2,4,6-tri(dimethyl-aminomethyl)phenol | 70/30/2 | n.d. | 32 |
| 33 | 35/35 | γ-butyrolactone/ triphenylphosphite 30/70 | — | 70/30/2 | n.d. | 29 |
| 34 | 35/35 | γ-butyrolactone/ triphenylphosphite 70/30 | 2,4,6-tri(dimethyl-aminomethyl)phenol | 70/30/2 | n.d. | 41 |
| 35 | 35/35 | γ-butyrolactone/ triphenylphosphite 70/30 | 2-methyl-imidazole | 70/30/2 | 112 | 35 |
| 35 | 60/10 | γ-butyrolactone/ triphenylphosphite 70/30 | 2-methyl-imidazole | 70/30/2 | 118 | 52 |
| 37 | 60/10 | γ-butyrolactone/ triphenylphosphite 70/30 | 2-ethyl-4-methyl-imidazole | 70/30/2 | 120 | 46 |
| 38 | 60/10 | γ-butyrolactone/ triphenylphosphite 70/30 | 2,4,6-tri(dimethyl-aminomethyl)phenol | 70/30/2 | 115 | 37 | n.d.: not determined

The invention claimed is:

1. A liquid resin composition, comprising, based on the total weight of the liquid resin composition:
    (I) at least 30 wt % of a novolac resin having a glass transition temperature less than or equal to 60° C., wherein the novolac resin is obtained by reacting formaldehyde and phenol in the presence of an acid catalyst, and wherein the novolac resin contains less than 0.1% by weight of free formaldehyde;
    (II) at least 10 wt % of a reactive diluent, wherein the reactive diluent is a liquid at room temperature and comprises at least one functional group selected from the group consisting of a hydroxy, an aldehyde, an epoxy, an oxazolidine, and a lactone; and
    (III) from 20 wt % to 40 wt % of a crosslinking agent, wherein the liquid resin composition has a viscosity of less than or equal to 7,000 mPa·s at room temperature.

2. The composition of claim 1, wherein the novolac resin (I) has a glass transition temperature of less than or equal to 50° C.

3. The composition of claim 1, wherein the novolac resin (I) contains less than 0.05% by weight of free formaldehyde.

4. The composition of claim 3, wherein the novolac resin (I) is obtained by reacting formaldehyde and phenol in the presence of an acid catalyst with a molar ratio of formaldehyde to phenol in a range from 0.2 to less than 1.

5. The composition of claim 1, further comprising a second resin, which is capable of reacting with the crosslinking agent and is different from the novolac resin (I), wherein the total weight of the novolac resin (I) and the second resin features a proportion of greater than or equal to 50% by weight of the novolac resin (I).

6. The composition of claim 5, wherein the second resin is an epoxy resin.

7. The composition of claim 1, comprising at least 40 wt % of the novolac resin (I), based on the total weight of the liquid resin composition.

8. The composition of claim 1, wherein the reactive diluent (II) has a viscosity of less than or equal to 1,000 mPa's at room temperature.

9. The composition of claim 8, wherein the reactive diluent (II) comprises at least one selected from the group consisting of
    a hydroxyl functional reactive diluent selected from the group consisting of saturated alicyclic alcohols, unsaturated alicyclic alcohols, saturated cyclic alcohols, unsaturated cyclic alcohols, mononuclear aromatic alcohols, polynuclear aromatic alcohols, and precursors of said alcohols;
    an aldehyde functional reactive diluent made of glyoxal;
    an epoxy functional reactive diluent selected from the group consisting of glycidyl ethers of saturated alcohols, glycidyl ethers of unsaturated alcohols, epoxidized fatty acids, and aromatic epoxies;
    an oxazolidine functional reactive diluent selected from the group consisting of 3-ethyl-2-methyl(3-methylbutyl)-1, 3-oxazolidine, 1-aza-3,7-dioxa(5-ethyl)bicyclo[3.3.0] octane and bisoxazolidines; and
    a lactone functional reactive diluent of gamma-butyrolactone.

10. The composition of claim 9, wherein the reactive diluent (II) is selected from the group consisting of glycerol, furfuryl alcohol, benzyl alcohol, a cardanol, a derivative of a cardanol, 1,6-hexanediol diglycidyl ether, an epoxidized cardanol, 3-ethyl-2-methyl(3-methylbutyl)-1,3-oxazolidine, 1-aza-3,7-dioxa(5-ethyl)bicyclo[3.3.0]octane, a bisoxazolidine, and gamma-butyrolactone.

11. The composition of claim 1, comprising at least 20 wt % of the reactive diluent (II), based on the total weight of the liquid resin composition.

12. The composition of claim 1, wherein the crosslinking agent (III) is selected from the group consisting of a compound comprising a hydroxy functional group, a compound comprising an aldehyde functional group, a heterocyclic compound having a structure comprising a nitrogen atom and an oxygen atom separated by a carbon atom, a nitroacetal, and a nitrone.

13. The composition of claim 12, wherein the crosslinking agent (III) is selected from the group consisting of tris(hydroxymethyl)nitromethane, glyoxal, 2,2-dimethoxyethanal, an oxazoline, and an oxazolidine.

14. The composition of claim 1, comprising from 30 to 40 wt % of the crosslinking agent (III), based on the total weight of the liquid resin composition.

15. The composition of claim 1, further comprising at least one crosslinking catalyst selected from group consisting of:
a compound comprising at least one secondary or tertiary amine functional group selected from the group consisting of hydroxylamine, triethylamine, diazabicyclo-undecene, benzyldimethyl amine, and 2,4,6-tri-(dimethylaminomethyl)phenol;
an imidazole;
an imidazole derivative selected from the group consisting of 2-methylimidazole, 2-ethyl-4-methylimidazole, and benzyl-2-methylimidazole;
a trialkyl or triaryl nucleophile selected from the group consisting of triethanolamine and trimethylphosphine
a triaryl nucleophile of triphenylphosphine;
a borate selected from the group consisting of tetraphenylphosphonium tetraphenylborate and tetraphenylphosphonium tetrafluoroborate; and
an ammonium salt selected from the group consisting of tetramethylammonium hydroxide and benzyltrimethylammonium hydroxide.

16. The composition of claim 15, wherein the at least one catalyst is present in an amount of no more than 10 parts by weight per 100 parts by weight of the novolac resin (I), the reactive diluent (II), and the crosslinking agent (III).

17. An abrasive article, comprising:
abrasive grains connected by a thermoset binder,
wherein the thermoset binder is obtained by crosslinking the liquid resin composition of claim 1.

18. The article of claim 17, in the form of a bonded abrasive.

19. The article of claim 17, in the form of a coated abrasive.

20. The article of claim 17, wherein the abrasive grains are selected from the group consisting of alumina, iron oxide, molybdenum oxide, vanadium oxide, alumina-zirconia, boron-alumina, silicon carbide, aluminium oxynitride, diamond, cubic boron nitride, or any and mixtures thereof.

21. The article of claim 20, wherein the abrasive grains are treated with a silane functionalized by organic groups.

22. The article of claim 21, wherein the silane is a vinylsilane, an aminosilane, or an epoxysilane.

* * * * *